Feb. 24, 1970  W. K. PRIESE  3,497,176
BALL VALVE HAVING PROGRESSIVE ENGAGEMENT OF BALL
AND YIELDABLE SEAT
Filed Oct. 9, 1967  2 Sheets-Sheet 1
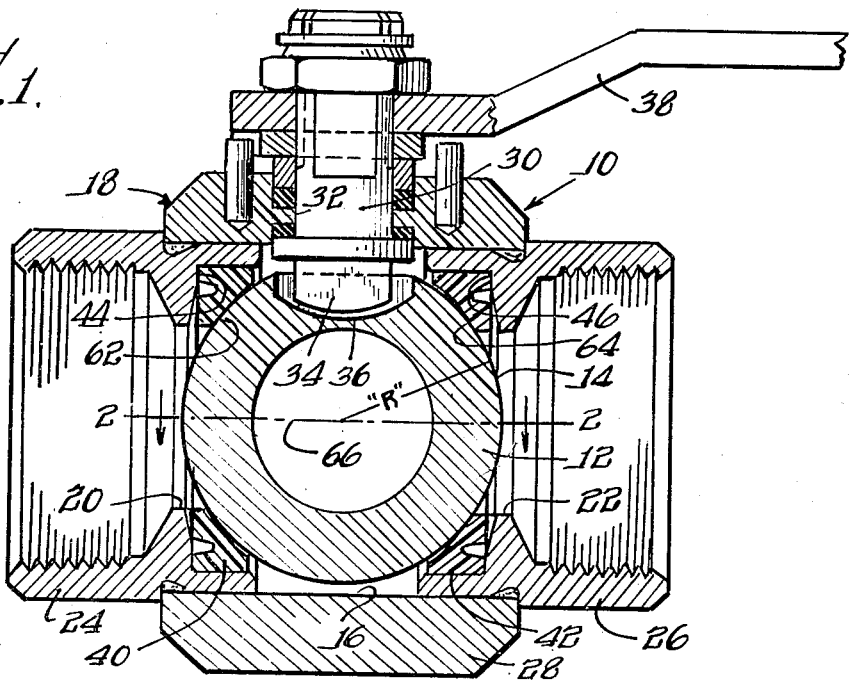
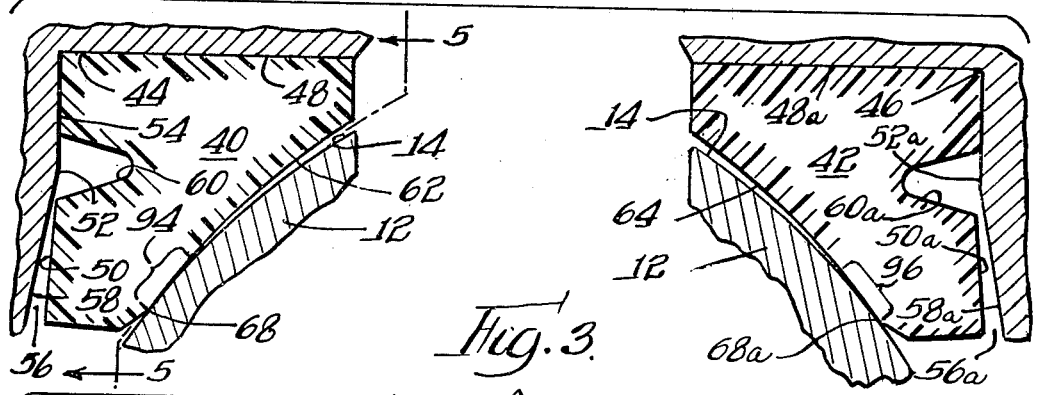
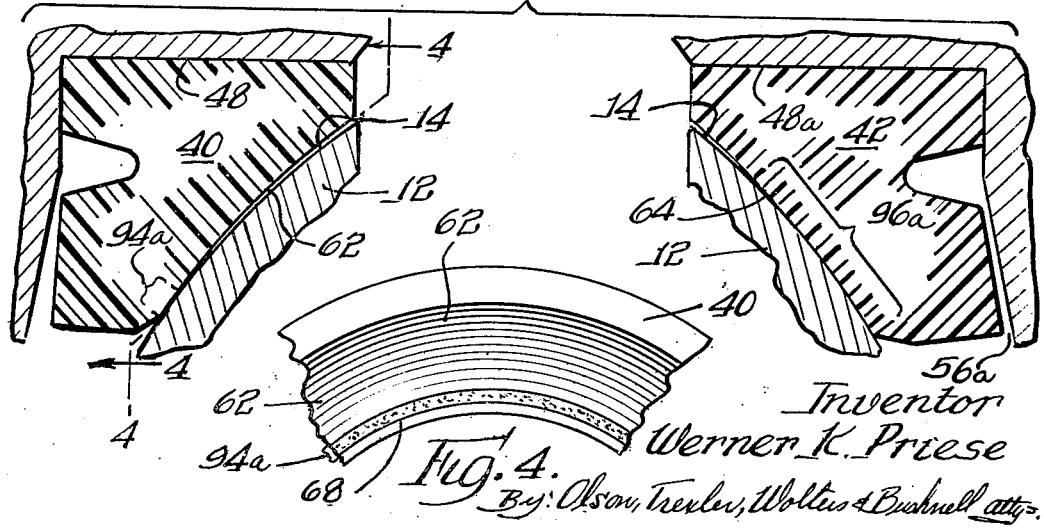
Inventor
Werner K. Priese
By: Olson, Trexler, Wolters & Bushnell attys.

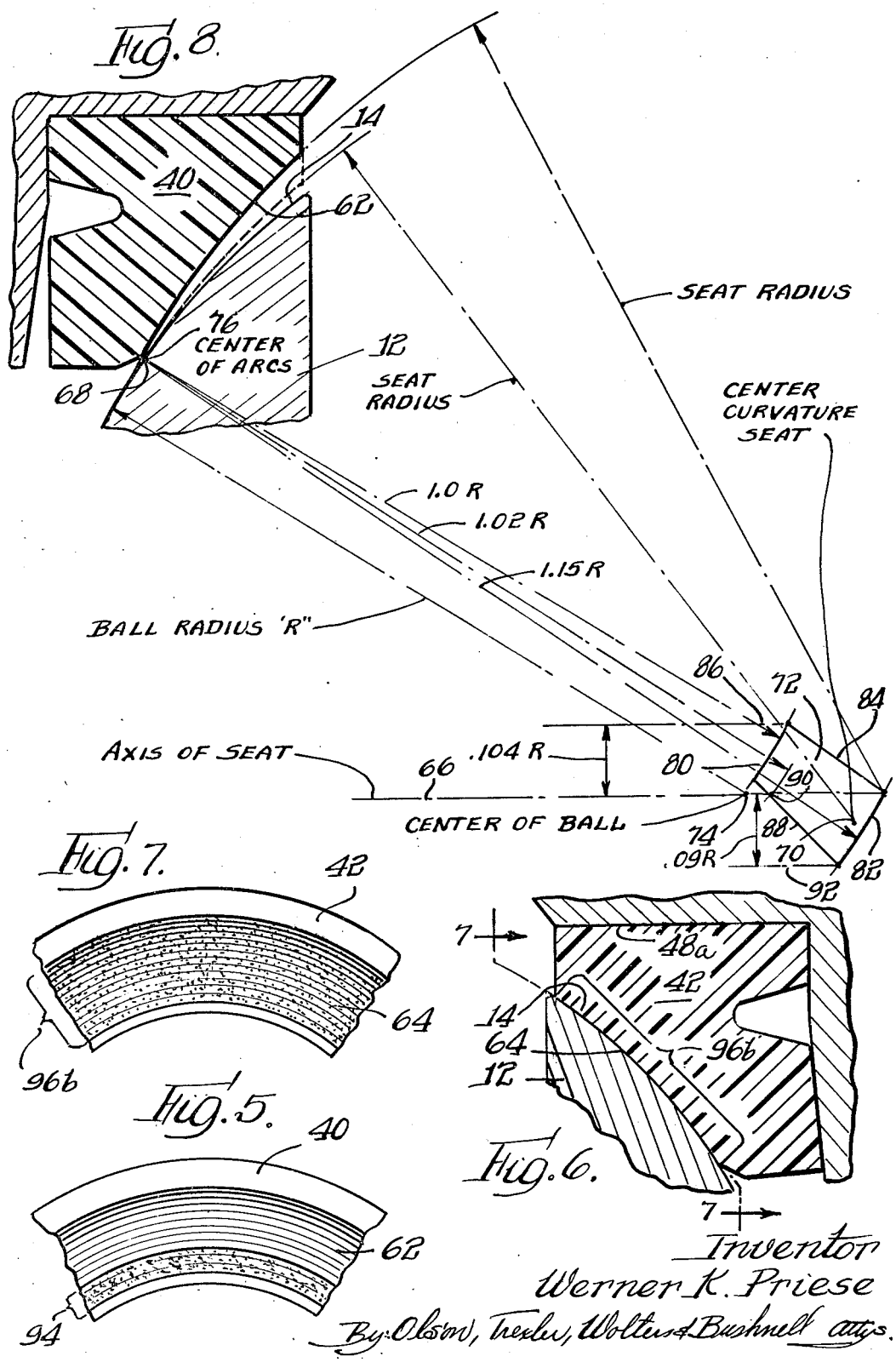

United States Patent Office 3,497,176
Patented Feb. 24, 1970

3,497,176
BALL VALVE HAVING PROGRESSIVE ENGAGE-
MENT OF BALL AND YIELDABLE SEAT
Werner K. Priese, Barrington, Ill., assignor to Hills-
McCanna Company, Carpentersville, Ill., a cor-
poration of Illinois
Filed Oct. 9, 1967, Ser. No. 673,718
Int. Cl. F16k 25/00, 5/00
U.S. Cl. 251—172                          4 Claims

ABSTRACT OF THE DISCLOSURE

A ball valve in which a ball engages a sealing surface of revolution formed on a yieldable valve seat and having in radial section a concave shape which diverges away from the ball surface in a laterally outward direction so that sealing contact between the ball and the sealing surface starts with annular line contact and subsequently varies progressively in width in accordance with the degree of progressive deformation of the seat by the ball.

---

The present invention relates to ball valves in which a generally spherical surface of the valve ball engages an annular sealing surface on a valve seat formed of a stiff yet yieldable material.

The problem of providing a ball valve of this character which will not leak when new, which is not unduly difficult to turn between open and closed positions and which is not unduly expensive to manufacture, is a most challenging one in relation to which prior ball valves have been marked by various shortcomings. The basic difficulty arises fom the fact that fluid under a high differential pressure will leak through even a minute interstice or interspace between the valve ball and the coacting sealing surface on the valve seat.

While the ball tends to wear away in time manufacturing irregularities in the coacting valve seat sealing surface, the propensity of such valves to leak fluid through interstices between the ball and seat produced by such manufacturing irregularities normally makes it impractical to allow time for such seat surface irregularities to be worn away by normal usuage of the valve in service.

The expedient of machining or otherwise finishing the seat sealing surface with an accuracy sufficient to form with the ball surface a precision fit capable of preventing leakage when the valve is new is inherently an expensive manufacturing procedure. The expedient of eliminating leakage by forcing the ball and seat together with adequate force to conform the sealing surface on the seat to the ball generally has the disavantage of making the ball undesirably difficult to rotate.

One object of the invention is to provide a ball valve in which an annular sealing surface on a seat of yieldable material is oriented in relation to the adjacent external surface of the ball in a manner taught by the invention such that good, leakage-free sealing of the valve is obtained at the time the valve is first placed into service even though the sealing surface is not finished with precision and even though the ball and seat sealing surface are mutually urged together with only an aptimum pressure which is normal for leakage-free sealing of the valve during its service life and limited to facilitate rotation of the valve ball with an operating torque which is materially minimized to advantage.

A more particular object of the invention is to provide a ball valve of the character recited in which significant sealing and operating advantages are obtained by a novel sealing relationship between the surface of the ball and a sealing surface formed on the valve seat as a surface of revolution and having, as viewed in radial section, a concave shape which diverges progressively away from the ball in a lateral direction with respect to the sealing surface, except as the divergence may be progessively modified by progressive deformation of the seat surface by the ball.

A further object is to provide a ball valve as recited in the preceding objects in which a sealing surface formed as a surface of revolution on a valve seat in confronting relation to the ball has, a viewed in radial section, a concave curvature with a radius of curvature dimentioned and a center of curvature located in such manner that sealing contact between the sealing surface and the ball starts along a line and subsequently varies progressively in width with progressive deformation of the yieldable seat.

An object of the invention is to achieve the previously recited objects in a ball valve in which the valve ball can move under the force of fluid pressure on the ball and the yieldable seat can be deflected by ball-applied stress so that the area of mutual engagement of the ball and the seat sealing surface varies progressively in width somewhat in accordance with the pressure urging the ball and seat surface together.

A further object is to provide a ball valve as recited in the preceding objects which affords the advantages related in the preceding objects while at the same time being simple in construction and inherently suited for economical manufacture.

Other objects and advantages will become apparent from the following description of the exemplary embodiment of the invention illustrated in the drawings in which:

FIG. 1 is a longitudinal, sectional view of a ball valve embodying the invention;

FIG. 2 is a fragmentary radial and longitudinal sectional view on an enlarged scale taken with reference to the line 2—2 of FIG. 1 and illustrating the positional relationship of the two yieldable valve seats to adjacent portions of the valve ball before the ball is displaced by the force of fluid pressure on the ball;

FIG. 3 is a fragmentary sectional view similar to FIG. 2 but illustrating the positional relationship of the valve seats to adjacent portions of the valve ball after the latter has been shifted somewhat in position by the force of fluid pressure on the ball;

FIG. 4 is a fragmentary sectional view taken along the arcuate line 4—4 of FIG. 3 and showing an arcuate portion of the sealing surface of one seat together with a graphic illustration of the area of mutual engagement of the sealing surface and the adjacent ball surface;

FIG. 5 is a view similar to FIG. 4 but taken with reference to the arcuate line 5—5 of FIG. 2;

FIG. 6 is a fragmentary sectional view similar to the right hand portion of FIG. 2 but illustrating the positional relationship of the downstream seat to the ball after the seat has been fully deflected in time by pressure applied by the ball;

FIG. 7 is similar to FIG. 4 but is taken with reference to the arcuate line 7—7 of FIG. 6; and FIG. 8 is a fragmentary radial sectional view showing a typical seat in its unstressed condition supported by coacting body structure of the valve and illustrating, for purposes of explanation, the curvature and orientation of the seat sealing surface in relation to the external curvature of the coacting ball.

Referring to the drawings in greater detail, the ball valve 10 forming the exemplary embodiment of the invention illustrated comprises a centrally bored flow control ball 12 having a generally spherical external surface 14 and being rotatably disposed within a valve chamber 16 formed within a valve body, indicated generally by the number 18, defining two flow passages 20, 22 opening into the chamber 16. In this instance, the valve body 18 is formed by two end sections 24, 26 screwed into opposite ends of a central section 28.

The ball 12 is rotated between its open valve and its closed valve positions, the closed valve position being illustrated in FIG. 1, by a valve stem 30 extending through a sealed stem bore 32 into the valve chamber 16 and having on its inner end a driving tang 34 extending into a coacting slot 36 in the ball 12 in such manner that the ball is free to move a limited distance under the force of fluid pressure on the ball in the direction of either of the fluid passages 20, 22. The outer end of the operating stem 30 connects with suitable driving means, in this instance a handle 38.

The spherically curved external surface 14 of the ball 12 slidably engages two annular valve seats 40, 42 disposed in encircling relation to the inner ends of the respective flow passages 20, 22 opening into the valve chamber 16. The valve seats 40, 42 are formed of a material which is stiff yet yieldable. Stiff yet yieldable polymeric materials have been widely used in the seats of ball valves and can be used to form the yieldable seats 40, 42. One such yieldable polymeric material commonly used in valves of this character is polytetrafluoroethylene, sold commercially under the trademark "Teflon." It is contemplated that the designer will select for use in constructing the seats 40, 42 a yieldable material of suitable physical qualities, the designer taking into account in the selection of a particular seat material the chemical characteristics of the fluid to which the valve will be exposed, temperature and pressure conditions under which the valve will operate in service and other pertinent considerations routinely considered by valve designers in the selection of particular structural materials for particular valves.

In the valve 10, the seats 40, 42 are seated in annular recesses 44, 46 in the inner ends of the body and sections 24, 26, as illustrated in FIG. 1. As seated in the annular recess 44, the seat 40 is encircled by first support means 48, FIG. 2, which contains the yieldable seat against radial expansion and is confronted along its radial side 50 opposite from the ball 12 by second annular support means 52 extending radially inward along the adjacent seat side 50 to support the seat 40 against axial force applied by the ball 12 in service.

As illustrated best in FIG. 2, the radially outward portion 54 of the second annular support means 52 has flat surface engagement with the adjacent radially outward portion of the seat 40 to sustain the outward portion of the seat 40 against axially outward displacement. The radially inward portion of the seat 40 and the confronting radially inward portion of the second support means 52 are shaped in relation to each other to diverge progressively away from each other in a radially inward direction to provide, when the parts of the valve are assembled together as illustrated in FIG. 2, a clearance space 56 between the radially inward portion of the radially outward side 50 of the seat 40 and the support 52 which allows clearance for limited dynamic displacement or working of the seat when the valve is in operation.

In the preferred construction illustrated, the clearance 56 is provided by shaping the radially inward portion 58 of the second support means 52 to have the form of a truncated cone which diverges inwardly away from the adjacent seat surface 50 as illustrated.

Dynamic displacement or working of the inward portion of the seat 40 is aided by forming in the radial side 50 of the seat 40 opposite from the ball 12 an annular notch 60 extending a very material distance axially inward into the body of the seat 40, as illustrated, at a radial location disposed medially between the radially inward and radially outward peripheries of the seat 40 and being preferably located, as shown, approximately one-third of the distance of the outer periphery toward the inner periphery of the seat 40.

As previously indicated, the seat 40 is formed of a polymeric material which is stiff even though yieldable.

The annular notch 60 formed in the outer radial side 50 of the seat 40, as described, aids in promoting the desired dynamic working or displacement to a limited degree of the inner portion of the seat 40 in service.

The seat 42 coacting with its adjacent side of the ball 12 constitutes a mirror image of the seat 40 in the valve illustrated and is shaped and supported in the same manner as the seat 40. To avoid unnecessary duplication of the description previously recited in relation to the seat 40, structural features and support structure for the seat 42 corresponding to counterparts previously described in relation to the seat 40 are denoted with the same reference numbers with the addition of the suffix "a."

In the valve 10 illustrated, the two yieldable polymeric valve seats 40, 42 are provided to effect sealing of the valve, when closed, on both the upstream and downstream sides of the ball and to make the valve equally useful for blocking differential fluid pressure across the valve in either direction.

The two valve seats 40, 42 respectively define two annular sealing surfaces 62, 64 confronting the spherically curved ball surface 14 and being formed individually as surfaces of revolution about the valve seat axis 66, which, in the valve illustrated, is common in both seats 40, 42. As viewed in radial section, FIG. 2, the sealing surfaces 62, 64 are disposed in generally oblique directions with respect to the respective seats 40, 42 reaching, as shown, across the major portion of the underlying width of the corresponding seat in each case.

As viewed in radial section, FIG. 2, the seat sealing surfaces 62, 64 each has a concave curvature generally approximating the spherical curvature of the adjacent external ball surface 14, but being oriented in a particular manner in relation to the ball surface 14 as provided by the invention in the manner which will be described.

The orientation of the sealing surface 62 on the seat 40, for example, in relation to the spherically curved ball surface 14 is such that when the seat is in its unstressed condition as shown in FIG. 8, initial contact between the sealing surface 62 and the external ball surface 14 is made along and initially confined to an annular line 68 along one edge of the surface 62 and the surface 62 then diverges progressively away from the ball surface 14 in a lateral direction with respect to the sealing surface 62.

As will presently appear, the annular area of mutual contact or engagement of the sealing surface 62 and the adjacent ball surface 14, which starts with line contact, progressively widens in width in a lateral direction with respect to the sealing surface 62 and subsequently varies laterally in width progressively in accordance wtih the degree of force tending to urge the ball and the sealing surface 62 into mutual engagement.

The manner in which the area of mutual engagement of the sealing surface 62 and the ball surface 14 varies in the course of usage of the valve is illustrated in FIGS. 2 through 7 and will subsequently be discussed in greater detail, it being understood that the orientation and action of the sealing surface 64 on the seat 42 in relation to the ball surface 14 being the same as that prevailing between the sealing surface 62 and the external ball surface.

The desired orientation of the sealing surface 62, for example, in relation to the ball surface 14 is obtained through adjustment of the radius of curvature of the sealing surface 62 and the center of curvature of the sealing surface 62, as viewed in radial section, FIG. 8, in relation to the radius of the ball surface 14 and in relation to the central axis 66 of the seat, respectively. In general, the desired divergence in a lateral direction of the sealing surface 62 from the ball surface 14 can be obtained either by making the radius of curvature of the sealing surface 62, as viewed in radial secton, different from the radius of curvature of the ball surface 14 or by offsetting the center of curvature of the sealing surface 62 in relation to the axis 66 of the seat or, thirdly, by using a combination of relationships in which the radius of curvature of the sealing surface 62 is made different from the radius of curvature of the ball surface 14 and the center of curvature of the sealing surface 62, as viewed in radial section, is offset from the axis 66 of the seat.

It will be appreciated that while the annular sealing surface 62 on the whole is a surface of revolution about the seat axis 66, the curvature of the surface 62 and the orientation of the surface 62 in relation to the ball surface 14, which are of the present concern, are the curvature and orientation of the sealing surface 62 as viewed in radial section, FIGS. 2, 3 and 8.

Further, it will be understood that in the graphic illustration in FIG. 8 pertaining to the dimensioning of radii of curvature and the location of centers of curvature to obtain maximum utilization of the invention, references to displacements from the seat axis 66 "toward" and "away from" the sealing surface 62 have reference to displacements toward and away from a particular radial section of the sealing surface 62 such as that illustrated in FIG. 8.

To provide a degree of divergence of the sealing surface 62 from the ball surface 14, as illustrated in the drawings, to afford optimum advantages, the radius of curvature of the sealing surface 62, as viewed in radial section, which radius is denoted in FIG. 8 by the legend "seat radius," should be dimensionally limited to a value which is at least equal to the radius R of the external ball surface 14 and no greater than 1.15 times the ball surface radius (1.15R). At the same time, the center of curvature of the sealing surface 62, as viewed in radial section, should not be offset from the seat axis 66 toward the sealing surface 62 by a distance exceeding .104R, i.e. exceeding a distance more than .104 times the radius of the ball surface 14. Also, the center of curvature of the sealing surface 62, as viewed in radial section, should not be offset from the seat axis 66 away from the sealing surface 62 by a distance more than .09R, i.e. more than .09 times the radius of curvature of the ball surface 14.

Having reference to the graphic illustration in FIG. 8, the full advantages of the invention are obtained when the center of curvature, denoted by the number 70 in FIG. 8 of the sealing surface 62, as viewed in radial section, is located within a generally four-sided area 72 disposed near the center 74 of the ball.

In FIG. 8, the inward lateral edge of the sealing surface 62 along which line contact between the sealing surface 62 and the ball surface 14 is initially made is denoted by the legend "center of arcs" and identified by the number 76.

The previously mentioned area 72, FIG. 8, within which lies the center of curvature 70 of the sealing surface 62 is bounded on a first side 80 by a first arc, also denoted by the number 80, having a radius of curvature equal to the radius of curvature R of the ball 12 and having a center of curvature located at the center of arcs 76. The area 72 has a second side 82 bounded by a second arc, also denoted by the number 82, having a radius of curvature equal to 1.15R, i.e. 1.15 times the radius of the ball 12 and having a center of curvature coinciding with the center of arcs 76. A third side 84 of the area 72 extends in a generally radial direction with reference to the sealing surface 62 between the arc side 80 and the arc side 82 and terminates at one end with the intersection of the arc side 82 with the seat axis 66 and terminates at its other end with the intersection of the arc side 80 with a line 86 parallel to the axis 66 and spaced from the axis 66 toward the sealing surface 62 by a distance equal to .104R, i.e. .104 times the ball radius. A fourth side 88 of the area 72 extends between said first arc side 80 and said second arc side 82 in a generally radial direction with respect to said sealing surface 62.

The side 88 is straight and passes through a point 90 on the seat axis 66 spaced from the center of arcs 76 by a distance equal to 1.02R. The side 88 joins the side 82 at the intersection of the latter with a line 92 parallel to the seat axis 66 and spaced away from the seat axis 66 by a distance equal to .09R.

The range of divergence of the sealing surface 62 in relation to the ball surface 14 which can be obtained by locating the center of curvature 70 of the surface 62 at different positions within the area 72 is illustrated graphically in FIG. 8, the maximum divergence being represented by a solid line and the minimum divergence being represented by a broken line. It will be understood that the lateral curvature and orientation of the sealing surface 64 in relation to the ball surface 14 is the same as that of the sealing surface 62 described.

The positional relationship of components of the valve is such that upon assembly of the valve, the ball 12 deflects the radially inward portions of the seats 40, 42 somewhat away from each other creating initial sealing pressure between the respective seats and the ball, FIG. 2. As a consequence of the previously described orientation of the seat sealing surface 62, 64 in relation to the confronting external ball surface 14, the sealing pressure between the sealing surfaces and the ball is intensified along the radially inward edges of the respective sealing surfaces.

As previously indicated, initial contact between the ball surface and the seat sealing surface 62, for example, is made along a line 68 at the inner edge of the sealing surface 62 and widens progressively in accordance with the degree of sealing pressure between the sealing surface 62 and the ball surface 14.

The width of the area of mutual engagement of the ball surface 14 and the sealing surface 62, for example, established upon assembly of the valve and illustrated in FIGS. 2 and 5 for the purpose of description is shaded in FIG. 5 and bracketed in FIG. 2 and identified by the reference number 94. A similar area of mutual engagement 96, FIG. 2, prevails between the ball surface 14 and the sealing surface 64.

FIGS. 3 and 4 are undertakings to represent graphically the condition which prevails when the valve is closed against differential fluid pressure which displaces the ball 12 in a downstream direction against the seat 42, located in this instance on the downstream side of the ball. The increased pressure of the ball 12 on the downstream seat 42 effects a progressive widening of the area of mutual engagement of the ball surface 14 and the downstream seat surface 64 as indicated by the bracket 96a in FIG. 3.

At the same time, the stress in the upstream seat 40, aided as it may be by the force of fluid pressure on the upstream side of the ball, acts on the upstream seat 40 to urge the radially inward portion of the upstream seat 40 against the ball surface 14 to establish and maintain a seal at the upstream side of the ball. Because of the possibly limited cumulative force urging the upstream seat against the ball surface, the area of mutual engagement of the ball surface 14 and the seat surface 62 may be quite narrow as indicated by shading in FIG. 4 and by a narrow bracket in FIG. 3 and identified by the reference number 94a.

Even though the cumulative force urging the seat sealing surface 62, for example, against the ball surface 14 may be quite limited, the fact that this force is concentrated along a very narrow zone, starting with line contact, by virtue of the described orientation of the sealing surface and ball surface, the mutual pressure between the seat sealing surface and the ball surface along the zone of mutual contact is sufficiently intense to smooth out and, in effect, eliminate manufacturing irregularities in the sealing surface 62 formed as it is by the yieldably polymeric structure of the seat 40. Thus, high spots on the surface 62 are effectively depressed along the area of mutual engagement of the sealing surface and the ball to assure effective sealing at all times even though the force urging the ball and seat together may be quite limited.

As indicated in FIG. 3, the force of fluid pressure on the ball 12 as transmitted to the downstream seat 42 operates to deflect the radially inward portion of the seat further into the clearance space 56a.

In general, the degree of deflection of the downstream seat tends to increase with increases in the differential pressure on the valve ball and with increases in the duration of service of the valve with the result that in time and on occasion the clearance space 56a at the radial side of the downstream seat may disappear and the zone of mutual engagement between the downstream seat surface 64 and the ball surface 14 may spread over the entire width of the seat surface 64 as indicated by shading in FIG. 7 and bracketing in FIG. 6 and identified by the reference number 96b. In this connection, it should be appreciated that the factors of service, time and forces of fluid pressure, taken individually or in combination, which are sufficient to cause the area of mutual engagement of the ball and a seat sealing surface to spread over the entire lateral width of the seat sealing surface function to smooth out any initial irregularities in the seat sealing surface to assure a leak-free seal between the ball and the seat.

What is claimed is:

1. A ball valve comprising, in combination, a valve body defining an internal valve chamber and two flow passages opening into said chamber, a centrally bored flow control ball rotatably disposed within said chamber and being movable under the force of fluid pressure thereon, said ball having thereon a generally spherical external surface, two annular valve seats formed of yieldable polymeric material and encircling the inner ends of said respective passages, first support means encircling each valve seat, second support means extending radially inward along the radial side of each valve seat opposite from said ball, the radially inward portion of said valve seat and the adjacent portion of said second support means therefor normally being spaced somewhat from each other when the valve seat is in an unstressed condition, each yieldable polymeric valve seat having an annular sealing surface formed as a surface of revolution about a central axis of the valve seat and confronting said ball to seal thereagainst; said sealing surface having in radial section a concave curvature which, in the unstressed condition of the valve seat, diverges progressively away from said ball surface in a laterally outward direction with respect to the valve seat axis; said sealing surface having in radial section a concave curvature with a center of curvature located within a generally four-sided area disposed near the center of the ball and bounded on a first side by a first arc having a radius of curvature equal to the radius of said ball surface and a center of curvature located at a center of arcs coinciding with the inner edge of said sealing surface, said area having a second side bounded by a second arc intersecting said axis of the seat and having a radius of curvature equal to 1.15 times the radius of said ball surface and a center of curvature located at said center of arcs, said area having a third side extending in a generally radial direction with reference to said sealing surface between said first and second arcs and terminating at one end with the intersection of said second arc with said axis and terminating at the other end with the intersection of said first arc with a line parallel to said axis and spaced therefrom toward said sealing surface by a distance equal to .104 times the radius of said ball surface, said area having a fourth side bounded by a line generally parallel to said third side and extending radially between said first and second arcs and passing through a point on said axis spaced from said center of arcs by a distance equal to substantially 1.02 times the radius of said ball surface, said fourth side terminating at the intersection of said second arc with a line parallel to said axis and spaced from said axis in a direction away from said sealing surface by a distance equal to .09 times the radius of said ball surface, the radially inner portion of each valve seat being movable under ball force thereon toward said second support means therefor to effect mutual engagement of said ball surface and said seat sealing surface over a progressively widening annular band of the latter, and means coacting with said ball to rotate the latter between open and closed valve positions thereof.

2. A ball valve comprising, in combination, a valve body defining an internal valve chamber and two flow passages opening into said chamber, a centrally bored flow control ball rotatably disposed within said chamber, said ball having thereon a generally spherical external surface, an annular valve seat formed of yieldable polymeric material and encircling the inner end of one of said passages, said yieldable polymeric valve seat having an annular sealing surface formed as a surface of revolution about a central axis of the valve seat and confronting said ball to seal thereagainst; said sealing surface having in radial section a concave curvature which, in the unstressed condition of the valve seat, diverges progressively away from said ball surface in a laterally outward direction with respect to the valve seat axis; said sealing surface having in radial section a concave curvature with a center of curvature located within a generally four-sided area disposed near the center of the ball and bounded on a first side by a first arc having a radius of curvature substantially equal to the radius of said ball surface and a center of curvature located at a center of arcs substantially coinciding with the inner edge of said sealing surface, said area having a second side bounded by a second arc intersecting said axis of the seat and having a radius of curvature substantially equal to 1.15 times the radius of said ball surface and a center of curvature located substantially at said center of arcs, said area having a third side extending in a generally radial direction with reference to said sealing surface between said first and second arcs, said third side joining said second arc at said axis and joining said first arc at a position spaced from said axis toward said sealing surface by a distance substantially equal to .104 times the radius of said ball surface, said area having a fourth side bounded by a line generally parallel to said third side and extending radially between said first and second arms and passing through a point on said axis spaced from said center of arcs by a distance equal substantially to 1.02 times the radius of said ball surface, said fourth side joining said second arc at a position spaced from said axis in a direction away from said sealing surface by a distance substantially equal to .09 times the radius of said ball surface, and means coacting with said ball to rotate the latter between open and closed valve positions thereof.

3. A ball valve comprising in combination, a valve body defining an internal valve chamber and two flow passages opening into said chamber, a centrally bored flow control ball rotatably disposed within said chamber, said ball having thereon a generally spherical external surface, an annular valve seat formed of yieldable material and encircling the inner end of one of said passages, said yieldable valve seat having an annular sealing surface confronting said ball to seal thereagainst and being formed as a surface of revolution about a central axis thereof; said sealing surface having in radial section a concave curvature oriented in relation to the generally spherical external surface of the ball to effect, upon light engagement of the ball with the sealing surface, contact between the sealing surface and the ball along only the inner edge of the sealing surface and to diverge progressively away from said generally spherical ball surface in a laterally outward direction; said sealing surface having in radial section a radius of general curvature which is at least equal to the radius of said ball surface but not greater than 1.15 times the ball surface radius, said sealing surface having in radial section a center of curvature which is disposed within a distance from said seat axis that is limited, in a direction toward said sealing surface, to .104 times the ball surface radius and that is limited, in a direction away from said seat surface, to .09 times the ball surface radius; said yieldable valve seat being subject to deflection by applied forces to effect mutual engagement of said sealing surface and said generally spherical ball surface over an annular band of said sealing surface which varies progressively in width in accordance with the degree of force urging said ball and said seat into mutual engagement, and means coacting with said ball to rotate the latter between open and closed valve positions thereof.

4. A ball valve comprising, in combination, a valve body defining an internal valve chamber and two flow passages opening into said chamber, a centrally bored flow control ball rotatably disposed within said chamber and being movable under the force of fluid pressure thereon, said ball having thereon a generally spherical external surface, an annular valve seat formed of yieldable polymeric material and encircling the inner end of one of said passages, first support means encircling said valve seat, second support means extending radially inward along the outer radial side of said valve seat, the radially inward portion of said valve seat and the adjacent portion of said second support means normally being spaced somewhat from each other when the valve seat is free of stress, said yieldable valve seat having an annular sealing surface formed as a surface of revolution about a central axis of the valve seat and confronting said ball to seal thereagainst; said sealing surface having in radial section a concave curvature oriented in relation to the generally spherical external surface of the ball to effect, upon light engagement of the ball with the sealing surface, line contact between the sealing surface and the ball along the inner edge of the sealing surface and to diverge progressively away from said generally spherical ball surface in a laterally outward direction with respect to said central axis of the seat; said sealing surface having in radial section a radius of general curvature which is at least equal to the radius of said ball surface but not greater than 1.15 times the ball surface radius, said sealing surface having in radial section a center of curvature which is disposed within a distance from said seat axis that is limited, in a direction toward said sealing surface, to .104 times the ball surface radius and that is limited, in a direction away from said seat surface, to .09 times the ball surface radius; said valve seat defining an annular notch radially positioned medially between the inner and outer peripheries of the valve seat and extending into the valve seat from said outer radial side thereof to facilitate movement of the radially inner portion of the valve seat under ball force thereon toward said second support means to effect mutual engagement of said generally spherical ball surface and said seat sealing surface over a progressively widening annular band of the latter, and means coacting with said ball to rotate the latter between open and closed valve positions thereof.

References Cited

UNITED STATES PATENTS

| 2,963,263 | 12/1960 | Sanctuary | 251—315 X |
| 3,030,068 | 4/1962 | Priese | 251—317 X |
| 3,047,007 | 7/1962 | Lunken | 251—172 X |
| 3,371,907 | 3/1968 | Scaramucci | 251—172 X |

M. CARY NELSON, Primary Examiner

MICHAEL O. STURM, Assistant Examiner

U.S. Cl. X.R.

251—315